C. O. ANDERSON.
TEAT CUP FOR MILKING MACHINES.
APPLICATION FILED FEB. 5, 1916.

1,213,814.

Patented Jan. 30, 1917.

Witnesses
Benjamin C. Stiwell.
Corvin S. Hall

Inventor
Carl Oscar Anderson
By
Attorney

UNITED STATES PATENT OFFICE.

CARL OSCAR ANDERSON, OF LANCASTER, PENNSYLVANIA.

TEAT-CUP FOR MILKING-MACHINES.

1,213,814.  Specification of Letters Patent.  Patented Jan. 30, 1917.

Application filed February 5, 1916. Serial No. 76,405.

*To all whom it may concern:*

Be it known that I, CARL OSCAR ANDERSON, a citizen of the United States, residing at Lancaster, in the county of Lancaster and State of Pennsylvania, have invented certain new and useful Improvements in Teat-Cups for Milking-Machines; and I do hereby declare the following to be a full, clear, and exact description of the invention, such as will enable others skilled in the art to which it appertains to make and use the same.

This invention relates to teat cups for milking machines, and is adapted for general application, and more particularly to teat cups designed for use with machines of the type in which the teat is subjected to intermittent or pulsating suction, such machines as are shown, for example, in Letters Patent of the United States issued to me October 20, 1914, No. 1,113,942, November 24, 1914, No. 1,118,257, and December 7, 1915, No. 1,162,844.

The objects of the invention are to provide a simple, efficient and inexpensive teat cup composed of separable members firmly but detachably secured together in such manner as to adapt them to be easily taken apart for cleaning purposes, or for the purpose of renewing or replacing a worn or broken portion, and to yieldably support the usual tapered member within an outer casing or tube in such manner that it will be drawn upwardly when the suction is applied and allowed to glide or move downwardly when released, to effect the desired milking operation similar to the operation of milking by hand.

The invention will first be hereinafter more particularly described, with reference to the accompanying drawings, which form a part of this specification, and then pointed out in the claims at the end of the description.

Figure 1:
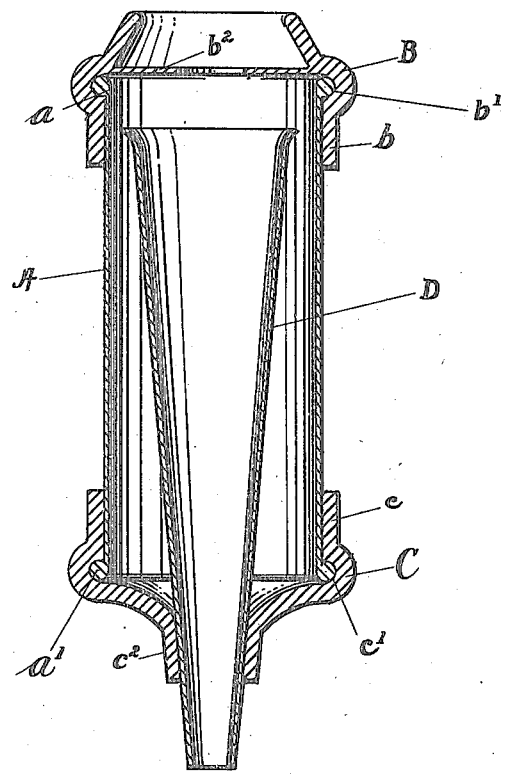
Figure 2:
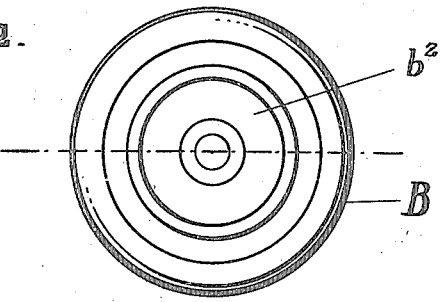

In said drawings, Figure 1 represents a vertical sectional elevation of a teat cup embodying my invention; and Fig. 2 is a top plan view thereof.

Referring to said drawings, in which the same reference letters are used to denote corresponding parts in different views, the letter A may denote an outer casing or tube which is preferably of uniform diameter from end to end, though other forms may be employed, and is formed or provided at its upper end with an annular rib or bead $a$, and at its lower end with a similar bead or rib $a^1$, over which may be sprung, respectively, the cylindrical part $b$ of an elastic, preferably rubber, mouth-piece B, and the corresponding part $c$ of an elastic closure C for the lower end of the tube. The mouth-piece B may be formed integrally with a perforated diaphragm $b^2$ centrally apertured to receive the teat depending therethrough into the teat cup proper or tapered member D. The cylindrical portion of the mouth-piece fitting over the upper end of the tube A has an annular recess $b^1$ therein to receive the bead or rib $a$, whereby the mouth-piece is secured and held in place on the tube under ordinary conditions with provision for removing it when desired without using other fastening means. The cylindrical portion of the flexible cap or closure C is also formed or provided with an annular groove or recess $c^1$ therein, to receive the rib or bead $a^1$ on the lower end of the tube A, whereby it is secured and held in place under normal conditions, the same as the mouth-piece, but may be easily removed and replaced when desired. The closure C has a reduced extension $c^2$, through which is inserted the lower end of the tapered or funnel-shaped member D, for attachment to the usual tubular suction connection and is thus supported within the tube with its upper end in proper position to receive the teat protruding through the aperture in the mouth-piece in such manner that as the teat is subjected to intermittent or pulsating suction, alternately pulling and releasing it, as the air pressure is turned on and cut off, the teat cup proper or tapered member will tend to squeeze the teat as it is pulled by the suction, and then glide or drop down, as the air pressure increases when the suction is cut off, and thus effect the operation of milking in a manner substantially similar to the operation of milking by the use of the hand.

Having thus described my invention, what I claim as new and desire to secure by Letters Patent of the United States is:

1. A teat cup comprising an outer casing open at both ends and having a mouth-piece at one end and a flexible closure at the other end thereof; said closure having a pendant tubular portion, and a tapered tubular member having its lower end inserted through the tubular pendant portion of said closure and supported thereby within said casing so as to adapt it to be given a reciprocatory movement by intermittent or pulsating suction.

2. A teat cup comprising a cylindrical member open at both ends having a detachable mouth-piece on one end and a detachable flexible closure at the other end thereof; said closure having a cylindrical portion fitting over the end of said cylindrical member and a reduced tubular extension depending therefrom, and a funnel-like member within said cylindrical member having its lower and smaller end protruding through the tubular extension of said closure and adjustably supported thereby within said cylindrical member.

3. A teat cup comprising an inflexible tubular member having at each end an annular rib or bead, a flexible mouth-piece having a cylindrical portion fitting over one end of said member, and a flexible cap or closure having a cylindrical portion fitting over the other end thereof; said cylindrical portions of said mouth-piece and closure each having an annular recess therein in which is seated one of the annular ribs on said flexible member for retaining it thereon, and a tapered tubular member adjustably supported by said flexible closure within said inflexible member so as to adapt it to be given a reciprocatory movement by pulsating suction.

4. A teat cup comprising an outer member of tubular form, an inner member of funnel-like form adjustably supported in said outer member, the support therefor comprising a flexible closure on the lower end of said tubular member having a pendant tubular portion through which said inner member protrudes, whereby the latter is adapted to be given a reciprocatory movement by intermittent or pulsating suction.

5. A teat cup comprising an outer cylindrical member of approximately uniform diameter from end to end having a flexible mouth-piece at one end and a flexible closure at the other end thereof; said closure having a pendant tubular portion, an inner member of funnel like form protruding through the pendant tubular portion of said closure and supported thereby within said outer member so as to adapt it to be given a reciprocatory movement by intermittent or pulsating suction, and means for securing said mouth-piece and closure to said cylindrical member so as to permit the same to be readily removed when desired for cleaning or for taking the device apart.

In testimony whereof I affix my signature in the presence of two witnesses.

CARL OSCAR ANDERSON.

Witnesses:
  Jno. N. Hetrick,
  Merle R. Buckhart.